(12) United States Patent
Spée et al.

(10) Patent No.: US 6,841,971 B1
(45) Date of Patent: Jan. 11, 2005

(54) CHARGE BALANCING SYSTEMS AND METHODS

(75) Inventors: René Spée, Bellingham, WA (US); Thanh Le, Ferndale, WA (US); Seth W. Jennings, Bellingham, WA (US)

(73) Assignee: Alpha Technologies, Inc., Bellingham, WA (US)

( * ) Notice: Subject to any disclaimer, the term of this patent is extended or adjusted under 35 U.S.C. 154(b) by 0 days.

(21) Appl. No.: 10/444,208

(22) Filed: May 24, 2003

Related U.S. Application Data

(60) Provisional application No. 60/384,324, filed on May 29, 2002.

(51) Int. Cl.[7] .................... H01M 10/44; H01M 10/46
(52) U.S. Cl. .................................................. 320/119
(58) Field of Search ........................... 320/116, 119, 320/120, 127, 137

(56) References Cited

U.S. PATENT DOCUMENTS

| | | |
|---|---|---|
| 4,079,303 A | 3/1978 | Cox |
| 4,184,197 A | 1/1980 | Cuk et al. |
| 4,186,437 A | 1/1980 | Cuk |
| 4,479,083 A | 10/1984 | Sullivan |
| 4,502,000 A | 2/1985 | Mashikian |
| 4,502,001 A | 2/1985 | Galloway |
| 4,684,814 A | 8/1987 | Radomski |
| 4,949,028 A | 8/1990 | Brune |
| 4,967,136 A | 10/1990 | Nofzinger |
| 5,003,244 A | 3/1991 | Davis, Jr. |
| 5,479,083 A | 12/1995 | Brainard |
| 5,528,122 A | 6/1996 | Sullivan et al. |
| 5,594,320 A | 1/1997 | Pacholok et al. |
| 5,666,041 A | 9/1997 | Stuart et al. |
| 5,710,504 A | 1/1998 | Pascual et al. |
| 5,956,241 A | 9/1999 | LoCascio |
| 5,982,142 A | 11/1999 | Sullivan et al. |
| 5,982,143 A | 11/1999 | Stuart |
| 6,008,623 A | 12/1999 | Chen et al. |
| 6,140,800 A | 10/2000 | Peterson |
| 6,222,344 B1 | 4/2001 | Peterson et al. |

*Primary Examiner*—Edward H. Tso
(74) *Attorney, Agent, or Firm*—Michael R. Schacht; Schacht Law Office, Inc.

(57) ABSTRACT

A system for equalizing the voltages across first and second batteries coupled in series at a common terminal comprising a capacitive storage element, first and second inductive storage elements, first and second switch circuits, and a control unit. The capacitive storage element is coupled to first and second nodes. The first inductive storage element is coupled between the first node and the first battery. The second inductive storage element is coupled between the second node and the second battery. The first switch circuit is coupled between the first node and the common terminal. The second switch circuit is coupled between the second node and the common terminal. The control circuit operates the first and second switch circuits to control current flow to the first and second batteries.

28 Claims, 10 Drawing Sheets

CHARGE BALANCING SYSTEMS AND METHODS

RELATED APPLICATIONS

This application claims priority of U.S. Provisional Ser. No. 60/384,324, filed May 29, 2002.

TECHNICAL FIELD

The present invention relates to systems and methods for balancing the charge on series-coupled storage elements and, more particularly, to modular charge balancing circuits that transfer charge between adjacent storage elements such that the charge on all of the storage elements in the string becomes substantially the same.

BACKGROUND OF THE INVENTION

Many electrical devices and systems operate at least partly on electrical power stored in storage elements. Storage elements are conventionally manufactured to supply direct-current power at a predetermined voltage level. If the electrical device or system to be powered requires a higher voltage level, the higher voltage level 's obtained by connecting a plurality of storage elements in series.

Currently, the most prevalent type of storage element is a battery. A battery is an electrochemical cell that can be charged electrically to store electric power and provide electric power when needed at a later time. The present invention is of particular significance when applied to two or more series connected batteries, and that application of the present invention will be described in detail below. The present invention may, however, be applied to other types of storage elements. For example, the present invention may be applied to series-connected electrostatic devices such as capacitors or super-capacitors. The term "battery" will thus be used herein to refer to any type of rechargeable storage element that is susceptible to unbalanced charge when connected in series.

Rechargeable batteries are often used to provide power in many situations. Examples of typical situations where rechargeable batteries are used include vehicles and portable computers designed to operate independent of utility power and uninterruptible power supplies that are configured to provide standby power should utility power or other main source of power be interrupted.

A rechargeable battery typically operates in either a charge mode in which the battery stores electrical power or in a supply mode in which the battery forms a source of electrical power. In the charge mode, an external power source is connected across the battery such that current flows into and charges the battery.

When batteries are connected in series, the simplest method of charging the batteries is to connect the external power source to the positive terminal of the first battery in the string and to the negative terminal of the last battery in the string. Ideally, current will flow through the batteries in the string and charge each of the batteries equally.

In practice, however, variations in individual batteries and charging conditions may cause an imbalance in the charge on individual batteries in the string. Continued imbalance of one battery in the string adversely impacts the life of that battery. In addition, when one battery fails, other batteries in the string tend to fail. The capacity of the battery string is limited by the weakest battery in the string, and it has long been recognized that correction of an imbalanced battery string is desirable.

The present invention is particularly suited for use as part of an uninterruptible power supply for use in communications systems such as CATV or telephony systems, and that application will be described herein in detail. It should be understood that the present invention may have broader application to other environments, such as computers or electric vehicles, and the scope of the present invention need not be limited to a particular embodiment designed for communication systems.

SUMMARY OF THE INVENTION

The present invention may be embodied as a system for equalizing the voltages across first and second batteries coupled in series at a common terminal. The equalizing system comprises a capacitive storage element, first and second inductive storage elements, first and second switch circuits, and a control unit. The capacitive storage element is coupled to first and second nodes. The first inductive storage element is coupled between the first node and the first battery. The second inductive storage element is coupled between the second node and the second battery. The first switch circuit is coupled between the first node and the common terminal. The second switch circuit is coupled between the second node and the common terminal. The control circuit operates the first and second switch circuits to control current flow to the first and second batteries.

The present invention may easily be scaled to accommodate any number of series connected batteries. The invention may further be implemented as a method of equalizing voltages across a plurality of series connected batteries. The present invention may additionally be implemented as part of a charging system for charging a plurality of series-connected batteries.

DETAILED DESCRIPTION OF THE INVENTION

Figure 1:
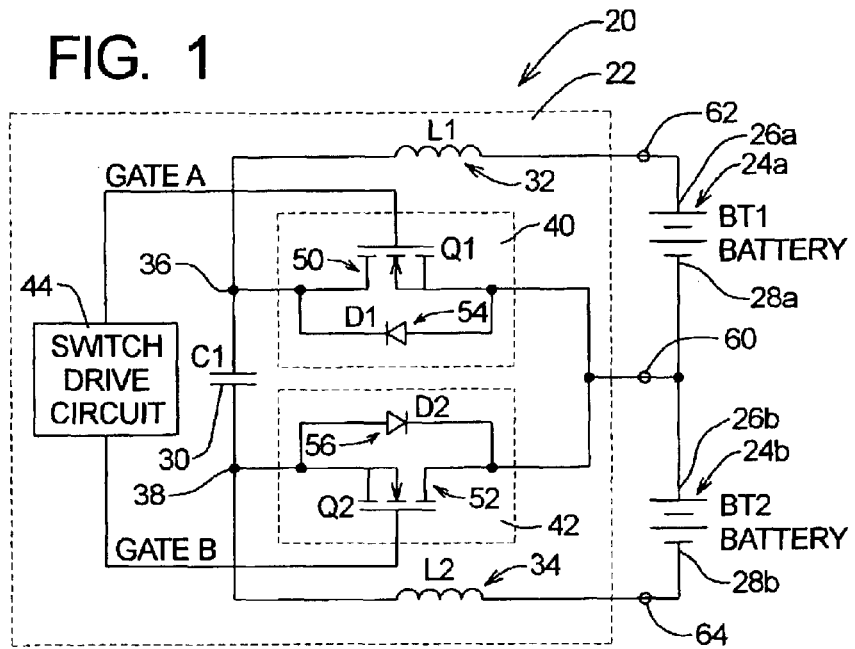
FIG. 1 is a circuit diagram of an exemplary charge balancing system of the present invention.

Referring initially to FIG. 1, depicted at 20 therein is a charge balancing system constructed in accordance with, and embodying, the principles of the present invention. The exemplary charge balancing system 20 comprises a charge balancing circuit 22 configured to balance the charge on each of a plurality of storage elements 24 connected in series. The storage elements 24 are depicted as, and will be referred to herein as, batteries. The principles of the present invention may, however, be applied to other devices for storing electrical energy, including electrostatic devices such as capacitors or super-capacitors.

The exemplary system 20 employs first and second batteries 24a and 24b, but the exemplary circuit 22 may be applied to strings of batteries comprising more than two batteries as will be described in further detail below. In the following discussion, letter suffixes are used to distinguish among the storage elements in a string of series-connected storage elements.

As is conventional, each of the batteries 24 defines a positive terminal 26 and a negative terminal 28. When connected in series, the negative terminal 28a of the first battery 24a in the series is connected to the positive terminal 26b of the second battery 24b. If more than two batteries are connected in series, the negative terminal 28b is connected to the positive terminal of the next battery in the string, and so on.

FIG. 1 illustrates that the exemplary charge balancing circuit 22 comprises a capacitor 30 and first and second inductors 32 and 34. The capacitor 30 is connected to the first and second inductors 32 and 34 at first and second nodes 36 and 38, respectively. In the exemplary circuit 22, the first inductor 32 is connected between the first node 36 and the positive terminal 26a of the first battery 24a, and the second inductor 34 is connected between the second node 38 and the negative terminal 28b of the second battery 24b.

As shown in FIG. 1, the charge balancing circuit 22 further comprises first and second switch circuits 40 and 42 and a switch drive circuit 44. The first switch circuit 40 is connected between the first node 36 and the negative terminal 28a of the first battery 24a. The second switch circuit 42 is connected between the second node 38 and the positive terminal 26b of the second battery 24b.

FIG. 1 further shows that the first and second switch circuits 40 and 42 comprise first and second transistors 50 and 52 and first and second diodes 54 and 56, respectively. Conventionally, the diodes 54 and 56 are internal to the transistors 50 and 52, respectively, and are connected in anti-parallel with these transistors 50 and 52.

In the first switch circuit 40, the source and drain terminals of the first transistor 50 are connected to the negative terminal 28a of the first battery 24a and to the first node 36, respectively. The gate terminal of the first transistor 50 is connected to the switch drive circuit 44. The anode and cathode terminals of the first diode 54 are connected to the source and drain terminals of the first transistor 50. The drain and source terminals of the second transistor 52 of the second switch circuit 42 are connected to the positive terminal 26b of the second battery 24b and to the second node 38, respectively. The gate terminal of the second transistor 52 is also connected to the switch drive circuit 44. The anode and cathode terminals of the second diode 56 are connected to the source and drain terminals of the second transistor 52.

The first switch circuit 40 is thus configured to allow or prevent current flow between the first node 36 and the node 60. The second switch circuit 42 is similarly configured to allow or prevent current flow between the second node 38 and the node 60. While the exemplary switch circuits 40 and 42 are preferred, one of ordinary skill in the art will recognize that other circuits may be substituted for the exemplary switch circuits 40 and 42. The scope of the present invention is thus not limited to the details of the switch circuits 40 and 42.

In the exemplary charge balancing system 20, both of the switch circuits 40 and 42 are controlled by the switch drive circuit 44. The switch drive circuit 44 may take any one or more of a variety of forms. In particular, the switch drive circuit 44 may be a passive or static system that controls the switch circuits 40 and 42 to open and close at a predetermined fixed duty cycle. Alternatively, the switch drive circuit 44 may be an active system that modulates the duty cycles of the signals GATE A and GATE B based on voltage and/or current feedback signals indicative of the charge on the batteries 24a and 24b.

In the exemplary balancing circuit 22, the exemplary switch drive circuit 44 is a static system that controls the switch circuits 40 and 42 to open and close at a fifty-percent duty cycle. In addition, the switch circuits 40 and 42 are controlled to be opened and closed out of phase with each other such that while the first switch circuit 40 is open the second switch circuit 42 is closed, and vice versa.

Although the exemplary circuit 22 employs a fifty-percent duty cycle, other duty cycles may be used. In addition, the exemplary switch drive circuit 44 is configured to control the switch circuits 40 and 42 to prevent the switches from being closed simultaneously during transition of one switch from open to closed and the other switch from closed to open. Accordingly, during transition from one of the switch circuits 40 or 42 to the other, the switch circuits 40 and 42 utilize a dead time to prevent accidental turn on of both switches at the same time. The use of a dead time during the transition from one switch to the other is conventional and will not be described herein in further detail.

Figure 2:
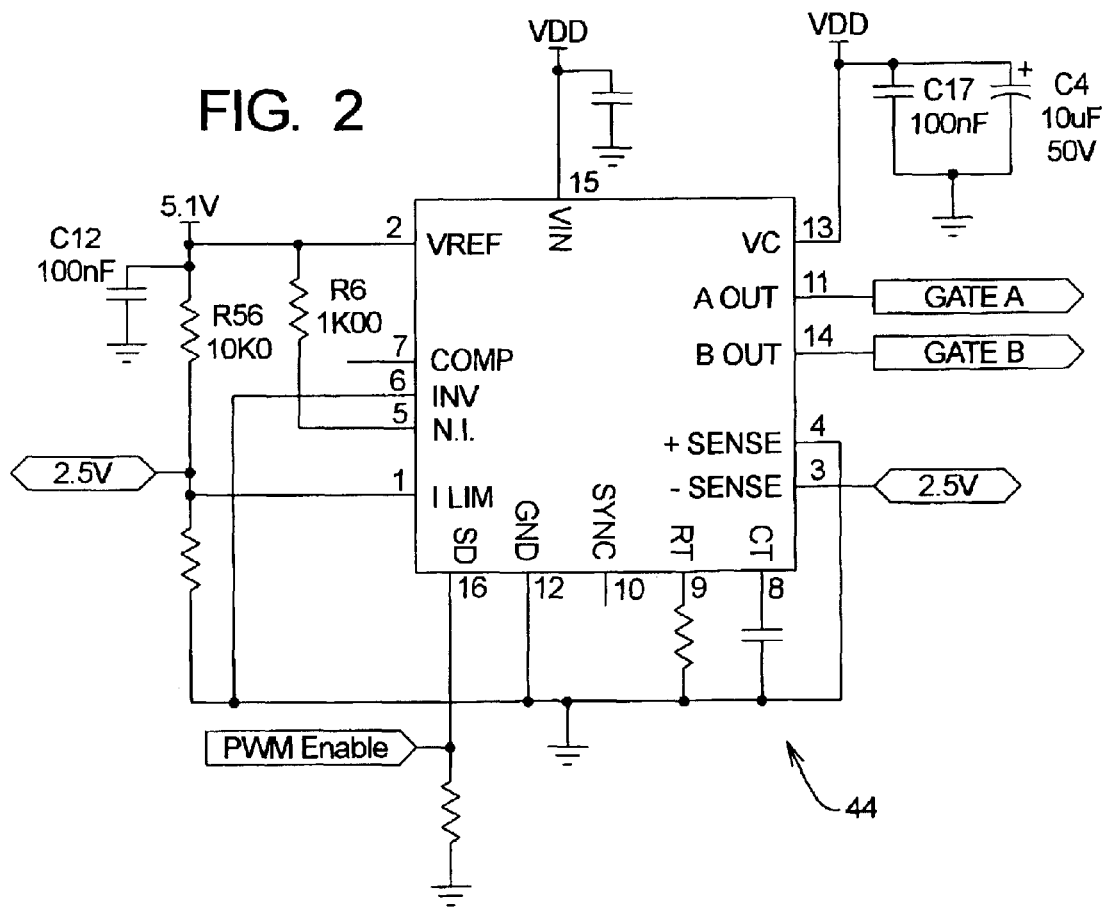
FIG. 2 is a circuit diagram of one example of a drive circuit that may be used by the charge balancing system depicted in FIG. 1.

One exemplary switch drive circuit 44 configured to open and close the switch circuits 40 and 42 as just described is depicted in FIG. 2. The exemplary switch drive circuit 44 generates signals GATE A and GATE B that are applied to the gate terminals of the transistors 40 and 42 as shown in FIG. 1. Again, the construction and operation of the switch drive circuit 44 is not critical to the present invention, and one of ordinary skill in the art will recognize that other circuits may be substituted for the exemplary circuit 44 depicted in FIG. 2.

The decision whether to use an active switch drive circuit that varies the duty cycle of the signals GATE A and GATE B or a static switch drive circuit with a fixed duty cycle depends upon the particular circumstances. A static switch drive circuit is simpler and less expensive to implement, but an active switch drive circuit can speed up the equalization of the charge on the series-connected storage elements. While a fixed duty cycle such as the fifty percent duty cycle described above may be adequate for many environments, certain environments may benefit from the faster equalization allowed by an active system.

In addition, as will be described in further detail below, the switch drive circuit 44 may either be remotely located, or monitored and controlled by a remotely located central monitor and control station. In either case, the voltage across each storage element and charge balancing current flowing between adjacent storage elements can be remotely measured. Based on these measurements, the remote monitor and control station can determine an appropriate duty cycle for a specific charge balancing circuit between two specific storage elements. In the case of an uninterruptible power supply using batteries as a storage element, the batteries can be maintained and protected so that the batteries are in good condition should the main power source be interrupted.

Figure 3A:
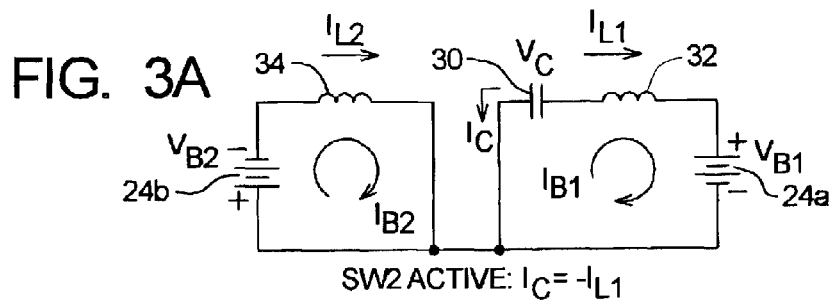
FIGS. 3A and 3B are equivalent circuits of the charge balancing circuit of the present invention in first and second configurations.
Figure 3B:
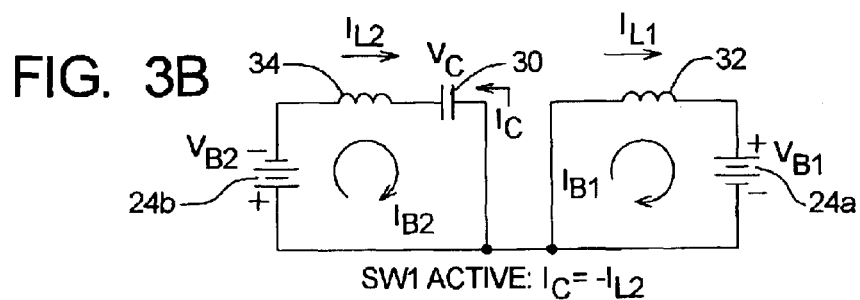

FIGS. 3A and 3B depict equivalent circuits in which the balancing circuit 22 operates depending upon the state of the switch circuits 40 and 42. The equivalent circuit of FIG. 3B depicts the situation in which the first switch circuit 40 is closed and the second switch circuit 42 is open. The equivalent circuit of FIG. 3A depicts the situation in which the first switch circuit 40 is open and the second switch circuit 42 is closed.

FIGS. 3A and 3B illustrate that voltages $V_{B1}$, $V_{B2}$, and $V_C$ are present across the batteries B1 and B2 and the capacitor C, respectively. Balancing currents $I_{B1}$ and $I_{B2}$ flow through the batteries B1 and B2, while currents $I_{L1}$ and $I_{L2}$ flow through the inductors L1 and L2. The current $I_{B1}$ through the battery B1 is the same as the current $I_{L1}$ through the inductor L1, and the current $I_{B2}$ through the battery B2 is the same as the current $I_{L2}$ through the inductor L2. A current $I_C$ flows through the capacitor C. FIGS. 3A and 3B further illustrate, with reference to the graphs of FIGS. 4, 5, and 6 described below, the directions in which the current $I_{L1}$ through the first inductor 30, the current $I_{L2}$ through the second inductor 32, and the current $I_C$ through the capacitor 30 flow when the switch circuits 40 and 42 are opened and closed as defined herein.

Figure 4A:
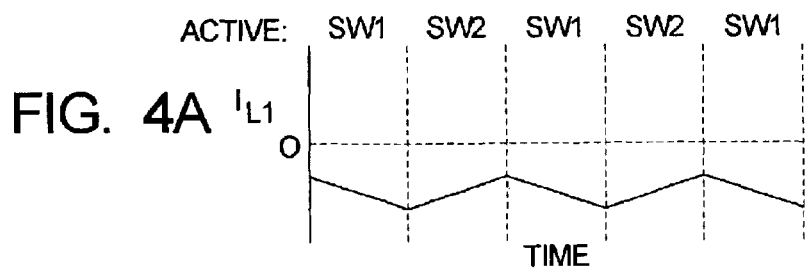
FIGS. 4A, 4B, and 4C are graphs depicting current flow defined by the equivalent circuits of FIGS. 3A and 3B under a first condition.
Figure 4B:
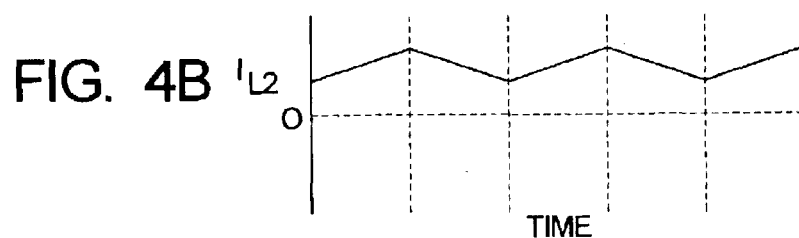
Figure 4C:
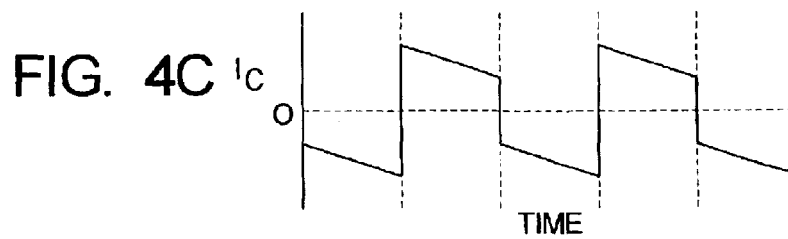
Figure 5A:
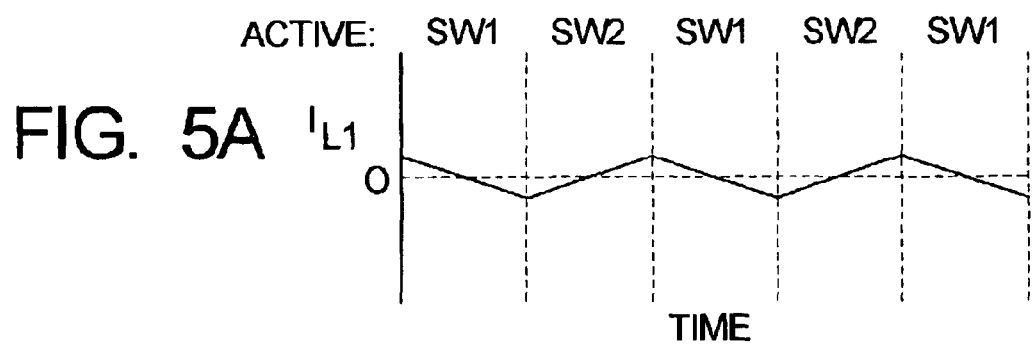
FIGS. 5A, 5B, and 5C are graphs depicting current flow defined by the equivalent circuits of FIGS. 3A and 3B under a second condition.
Figure 5B:
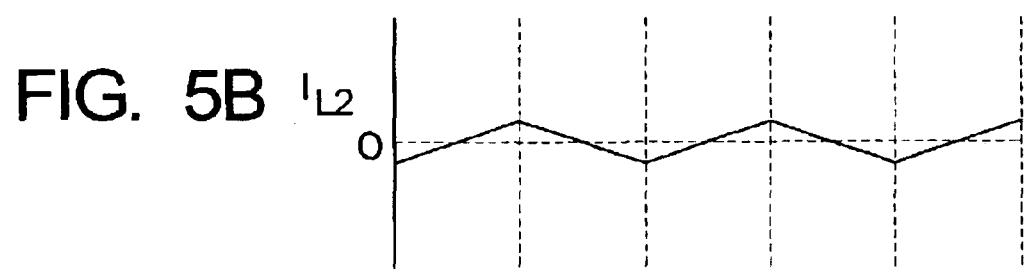
Figure 5C:
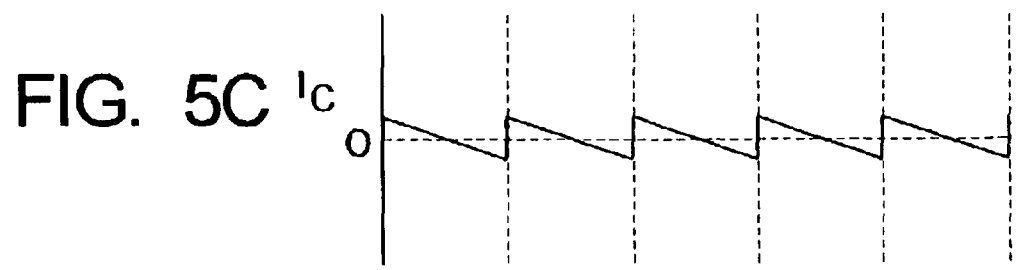
Figure 6A:
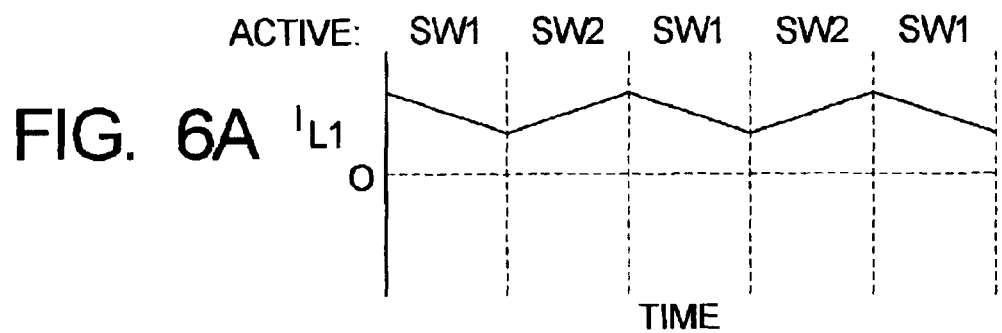
FIGS. 6A, 6B, and 6C are graphs depicting current flow defined by the equivalent circuits of FIGS. 3A and 3B under a third condition.
Figure 6B:
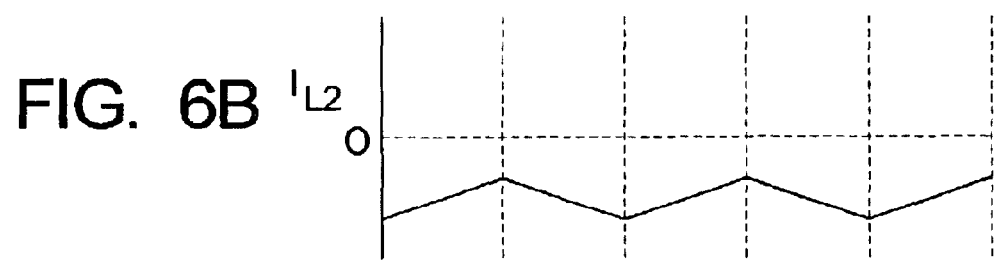
Figure 6C:
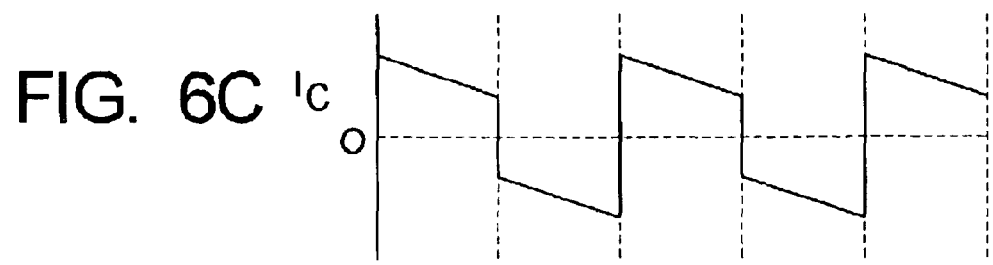

FIGS. 4A–C, 5A–C, and 6A–C are graphs depicting the currents $I_{L1}$, $I_{L2}$, and $I_C$ under various operating conditions. In particular, FIGS. 4A, 4B, and 4C depict the currents $I_{L1}$, $I_{L2}$, and $I_C$ when the voltage level of the first battery 24a is greater than the voltage level of the second battery 24b. FIGS. 5A, 5B, and 5C depict the currents $I_{L1}$, $I_{L2}$, and $I_C$ when the voltage level of the first battery 24a is equal to or approximately equal to the voltage level of the second battery 24b. FIGS. 6A, 6B, and 6C depict the currents $I_{L1}$, $I_{L2}$, and $I_C$ when the voltage level of the first battery 24a is less than the voltage level of the second battery 24b.

In the situation depicted in FIGS. 4A–C, energy is moved from the first battery 24a to the second battery 24b in two stages through the capacitor 30 and the inductors 32 and 34. In the situation depicted in FIGS. 5A–C, little or no energy is transferred between the first and second batteries 24a and 24b. Energy is moved from the second battery 24b to the first battery 24a in two stages through the capacitor 30 and the inductors 32 and 34 in the situation depicted in FIGS. 6A–6C.

FIGS. 4 and 6 illustrate that, when the voltage levels of the batteries B1 and B2 are not equal, current flows from the battery 24a or 24b with the higher voltage to the capacitor 30 and then from the capacitor 30 to the battery 24a or 24b with the lower voltage. The inductors 32 and 34 operate to maintain continuous current flow into or out of the batteries 24a and 24b; the currents $I_{B1}$ and $I_{B2}$ flowing into or out of the batteries 24a and 24b thus never become discontinuous. The result is that the currents $I_{B1}$ and $I_{B2}$ flowing into and out of the batteries 24a and 24b are comprised of a fairly constant DC component with a relatively small AC component superimposed thereon.

Referring for a moment back to FIG. 1, it can be seen that first, second, and third terminals 60, 62, and 64 are arranged between the charge balancing circuit 22 and the first and second batteries 24a and 24b. The first terminal 60 represents the point at which the balancing circuit 22 is connected to the negative terminal 28a of the first battery 24a and the positive terminal 26b of the second battery 24b. In particular, the switch circuits 40 and 42 are connected between the first and second nodes 36 and 38 and the first terminal 60, respectively.

The second terminal 62 represents the point at which the balancing circuit 22 is connected to the positive terminal 26a of the first battery 24a, and the third terminal 64 represents the point at which the balancing circuit 22 is connected to the negative terminal 28b of the second battery 24b. In particular, the second terminal 62 is arranged between the first positive terminal 26a and the first inductor 32, while the third terminal 64 between the second negative terminal 28b and the second inductor 34.

The exemplary charge balancing circuit 22 thus may be embodied as a modular circuit that may be replicated and applied to any two batteries in a string comprising more than two batteries.

Figure 7:
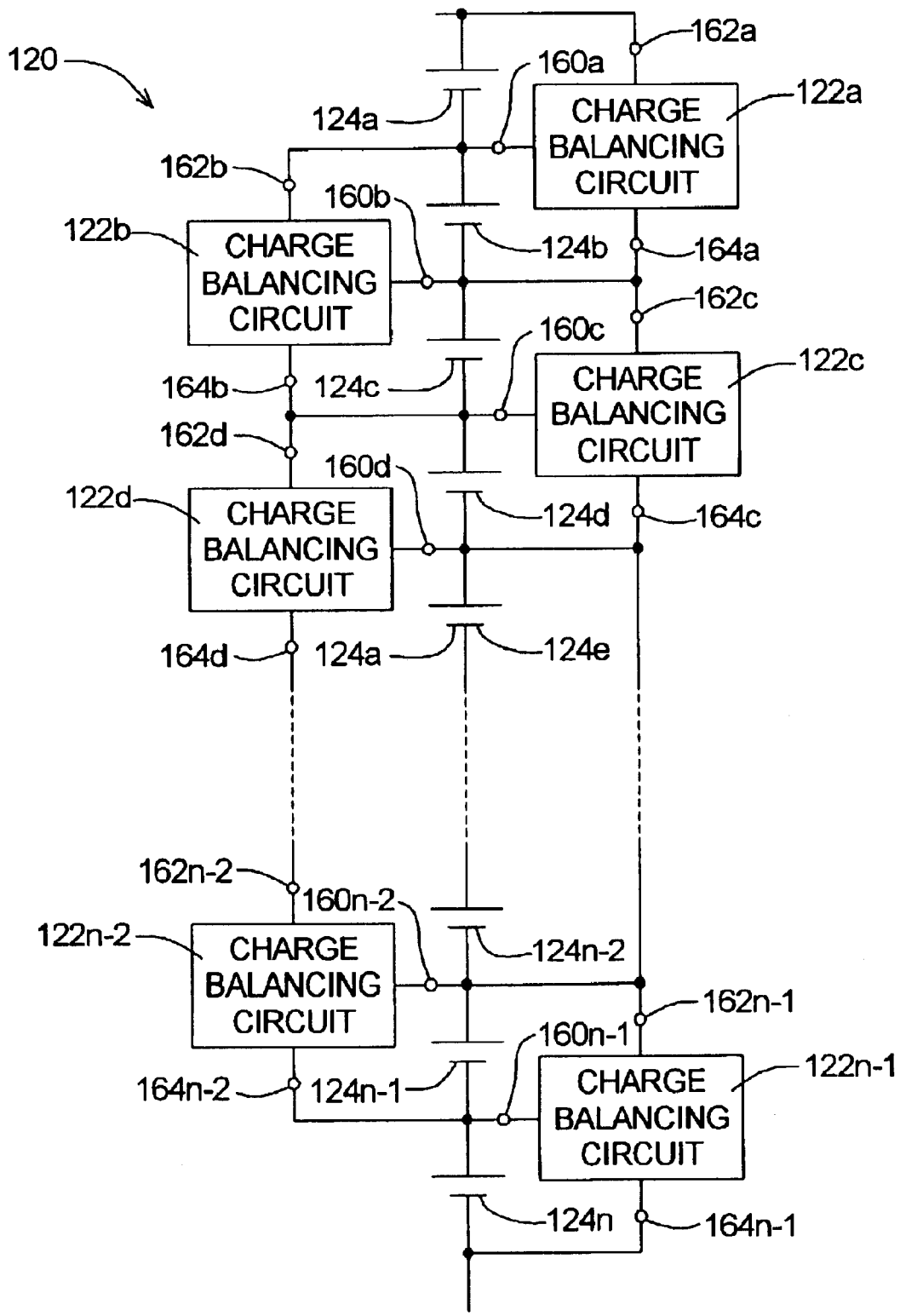
FIG. 7 is a schematic diagram depicting the use of the exemplary charge balancing system of FIG. 1 in a battery string comprising a plurality of batteries.

Referring now to FIG. 7, depicted therein is a charge balancing system 120 comprising a plurality of charge balancing circuits 122 and a string of more than two batteries 124. In particular, the system 120 of FIG. 7 represents the general case of a string of "n" batteries, where "n" is an integer greater than two. FIG. 7 shows that, if "n" batteries 124 are used, "n−1" charge balancing circuits 122 are used. The charge balancing circuits 122 are preferably the same as the charge balancing circuit 22 described above. These charge balancing circuits 122 define first, second, and third terminals 160, 162, and 164 that are substantially the same as the first, second, and third terminals 60, 62, and 64 described above.

The first terminals 160 of the charge balancing circuits 122 are connected to the connected negative and positive terminals of each adjacent pair of batteries. For each adjacent pair of batteries, first and second batteries are identified: the first battery is the battery the negative terminal of which is connected to the positive terminal of the other battery in the pair; and the second battery is the battery the positive terminal of which is connected to the negative terminal of the first battery. The second terminals 162 are connected to the positive terminal of the first battery, while the third terminals 164 are connected to the negative terminal of the second battery.

The circuits 122 operate independently of each other and are not interconnected other than is shown in FIG. 7. Nonetheless, the charge balancing circuits 122 transfer energy between adjacent batteries until an equilibrium point is reached at which the charge on all of the batteries is substantially the same.

Figure 8:
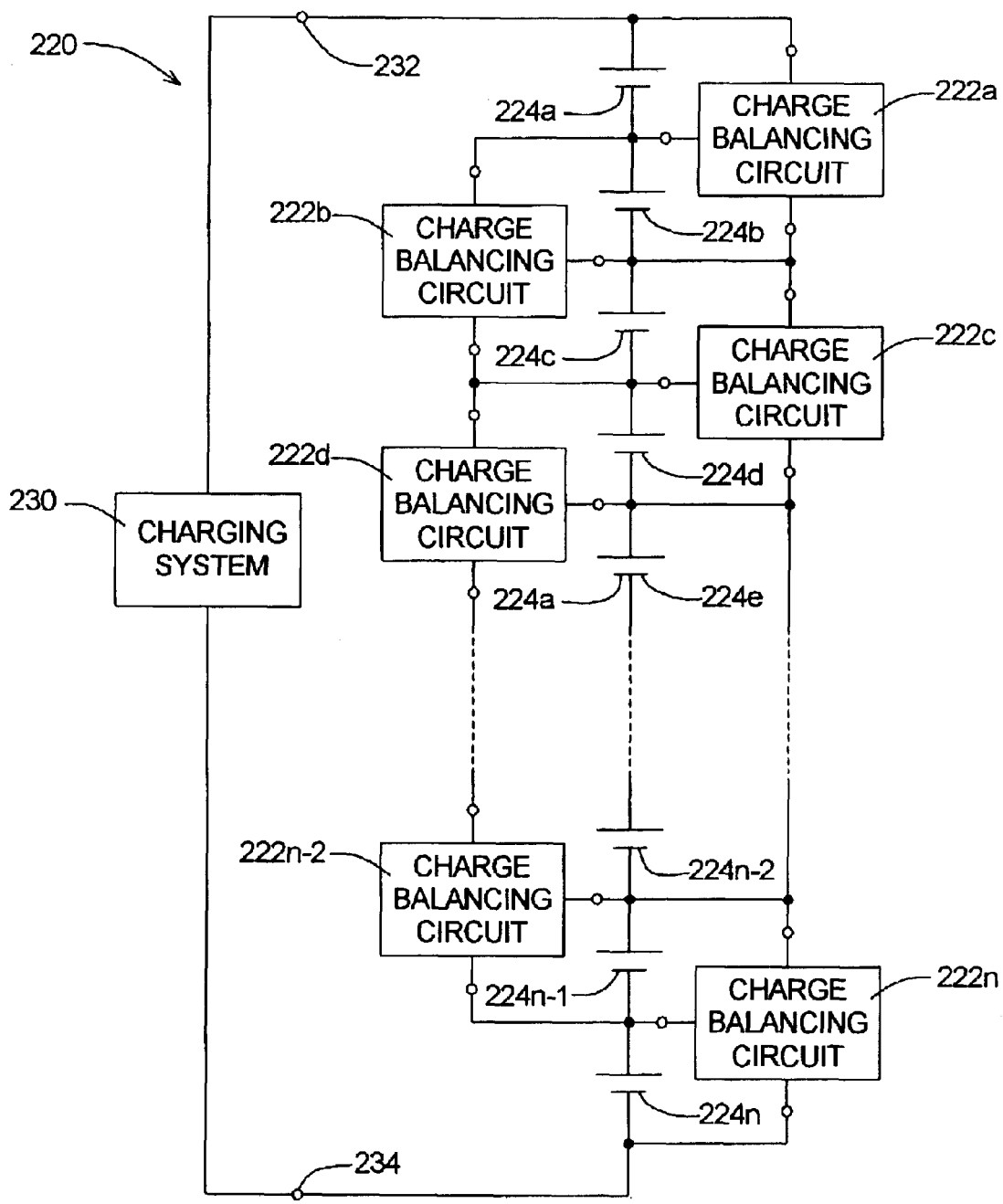
FIG. 8 is a schematic diagram depicting the use of the exemplary charge balancing system of FIG. 1 in a battery string comprising a plurality of batteries and with a charging circuit connected across the battery string.

Referring now to FIG. 8, depicted therein is a battery charging system 220 employing a plurality of charge balancing circuits 222, a string of batteries 224, and a charging system 230. The charge balancing circuits 222 are preferably the same as the charge balancing circuit 22 described above.

The charging system 230 is or may be conventional and defines first and second charger terminals 232 and 234 that are connected across the battery string. In particular, the first charger terminal 232 is connected to the positive terminal of the first battery 224a of the string, while the second charger terminal 234 is connected to the negative terminal of the last battery 224n of the string. The charge balancing circuits 222 are connected to adjacent pairs of the batteries 224 in the same manner as in the case of the charge balancing system 120 described above.

As is conventional, the charging system 230 generates a charging current that flows from the first charger terminal 232 to the second charger terminal 234 through the string of batteries 224. The battery string stores energy such that the total voltage across the entire string equals a charging voltage of the charging system 230. The charge balancing circuits 222 transfer energy between adjacent batteries to equalize the charge on the batteries within the string.

Figure 9:
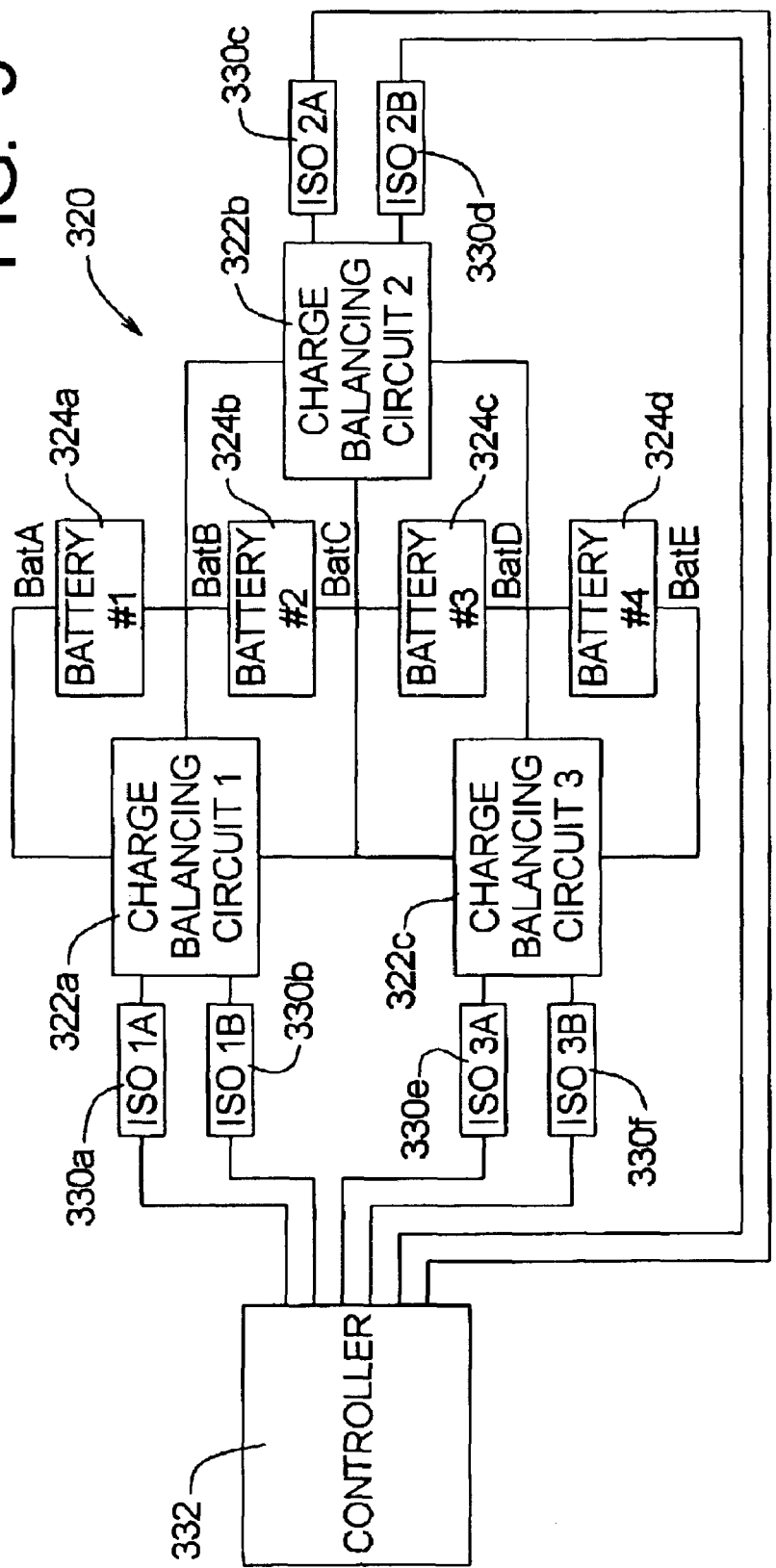
FIG. 9 is a block diagram depicting another exemplary circuit implementing the charge balancing system of the present invention.

Referring now to FIG. 9, depicted therein is yet another charge balancing system 320 of the present invention. The charge balancing system 320 comprises a plurality of charge balancing circuits 322 and is used with a string of four batteries 324. In addition to the exemplary charge balancing circuits 322, the system 320 comprises a plurality of isolation circuits 330 and a controller circuit 332. The charge balancing circuits 322 may be the same as the charge balancing circuits 22, 122, and 222 described above.

The controller circuit 332 supplies a control signal to the isolation circuits 330. The isolation circuits 330 isolate the controller circuit 332 from the charge balancing circuits 322. In particular, each particular charge balancing circuit 322 operates at a reference voltage level defined by the placement in the string of the pair of batteries 324 to which that particular charge balancing circuit 322 is connected.

The charge balancing circuits 22, 122, and 222 may be designed to operate independent of each other, in which case the different reference voltage levels are not a factor. The charge balancing circuits 22, 122, and 222 may, however, be designed to be controlled from a centralized control circuit, in which case the different reference voltage levels may need to be accommodated.

The isolation circuits 330 may be implemented using any number of different techniques. For example, an isolation circuit may be formed using a conventional opto-coupler device. However, the operational speeds of current opto-coupler devices limit the speed of the clock signal and any data signals sensed at the charge balancing circuits 322.

Figure 10:
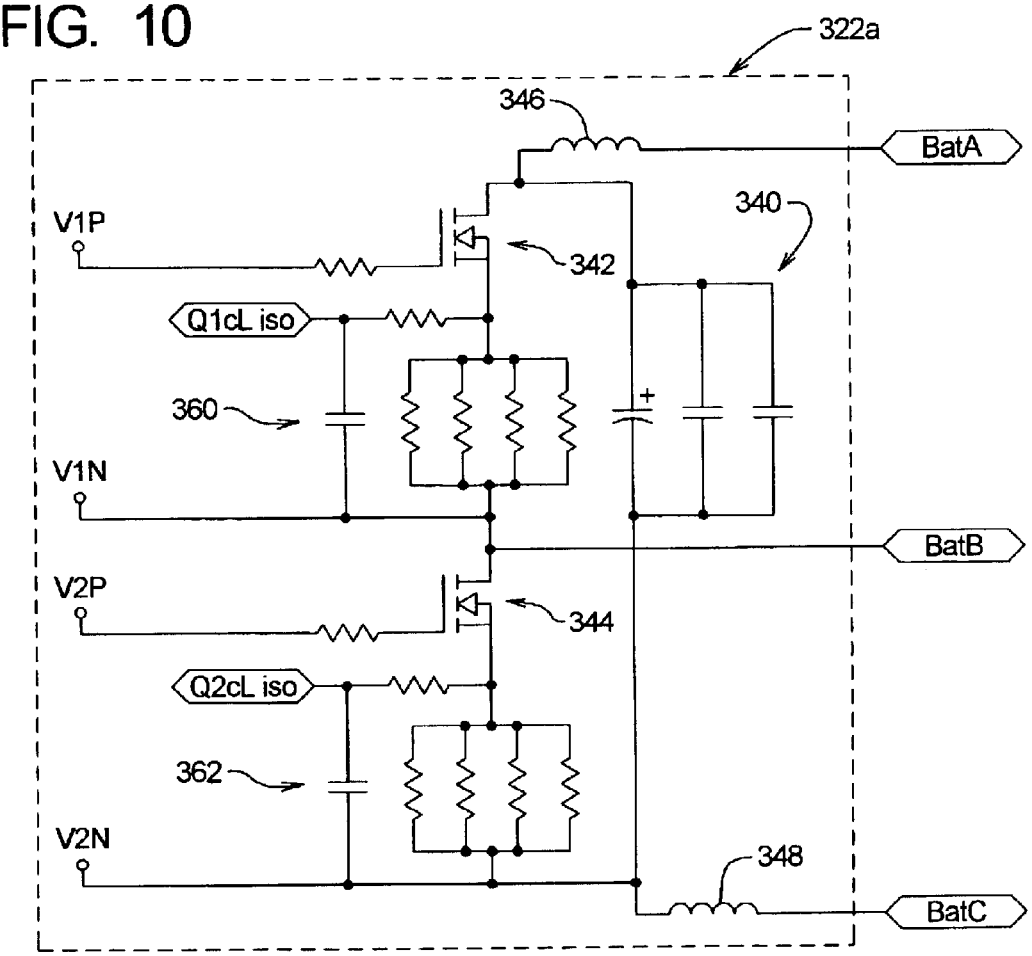
FIG. 10 is a circuit diagram depicting an exemplary charge balancing circuit used by the charge balancing system of FIG. 9.
Figure 11:
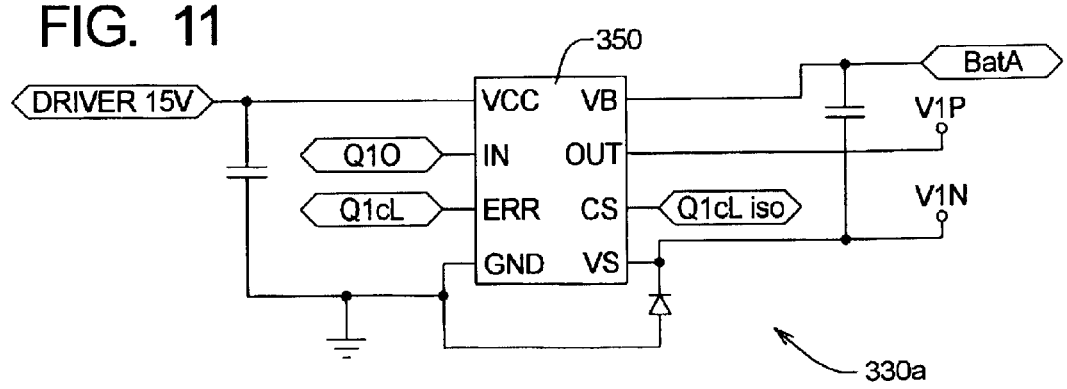
FIG. 11 is a circuit diagram depicting an exemplary isolation circuit used by the charge balancing system of FIG. 9.

Referring now to FIGS. 10 and 11, depicted therein are the details of a preferred charge balancing circuit 322 and an isolation circuit 330 used by the system 320. Referring initially to the charge balancing circuit 322a, that circuit comprises a capacitor circuit 340, first and second switch circuits 342 and 344, and first and second inductors 346 and 348. The capacitor circuit 340, switch circuits 342 and 344, and inductors 346 and 348 of the circuit 322a generally perform the functions of the capacitor 30, switch circuits 40 and 42, and inductors 32 and 34, respectively, of the charge balancing circuit 22 described above.

One of the isolation circuits 330 is associated with each of the switch circuits 342 and 344. As shown in FIG. 11, the exemplary isolation circuit 330 employs an integrated circuit 350 to isolate the controller circuit 332 from the first switch circuit 342, but a similar function may be implemented using discrete components. The exemplary integrated circuit 350 is an IR2125S circuit. The terminals to the left on the circuit 350 as depicted in FIG. 11 are referenced to the same voltage level as the controller circuit 332. The terminals to the right on the circuit 350 as depicted in FIG. 11 are referenced to one of the terminals associated with one of the batteries 324.

The charge balancing circuit 322a depicted in FIG. 10 is connected to the battery terminals BatA, BatB, and BatC associated with the first and second batteries 324a and 324b as shown in FIG. 9. The isolation circuit 330a depicted in FIGS. 9 and 11 is referenced to the battery terminal BatA and is connected to terminals V1P and V1N of the first switch circuit 342.

The functions of the switch drive circuit 44 described above are thus performed by the combination of the controller circuit 332 and the isolation circuit 330. As depicted in FIG. 10, the exemplary charge balancing circuit 322 thus does not include an internal switch drive circuit.

In addition, many systems employing a string of batteries, such as uninterruptible power supplies used in communications networks, detect and collect status data indicating the operating status of the batteries. The collection of status data can be enhanced by the use of a centralized controller such as the circuit 332 described above. The centralized controller circuit 332 must also be designed to work with the different reference voltage levels associated with the charge balancing circuits 322.

Accordingly, the charge balancing circuits 322 may be provided with current sense circuits 360 and 362, and the controller circuit 332 may cause the system 320 to operate in both a balancing mode and in a sensing mode. In the balancing mode, the controller circuit 332 opens and closes the switch circuits 342 and 344 through the isolation circuits 330 at a predetermined frequency and duty cycle. In the sensing mode, the controller circuit 332 operates the switches 342 and 344 using current sense signals provided by the current sense circuits 360 and 362 which are indicative of inductor current. The current sense circuits 360 and 362 are each coupled to one of the isolation circuits 330, which convert the current sense signals to a level appropriate for processing by the controller circuit 332. The controller circuit 332 may thus receive status data based on the current sense signals to be used for sensing mode control.

Figure 12:
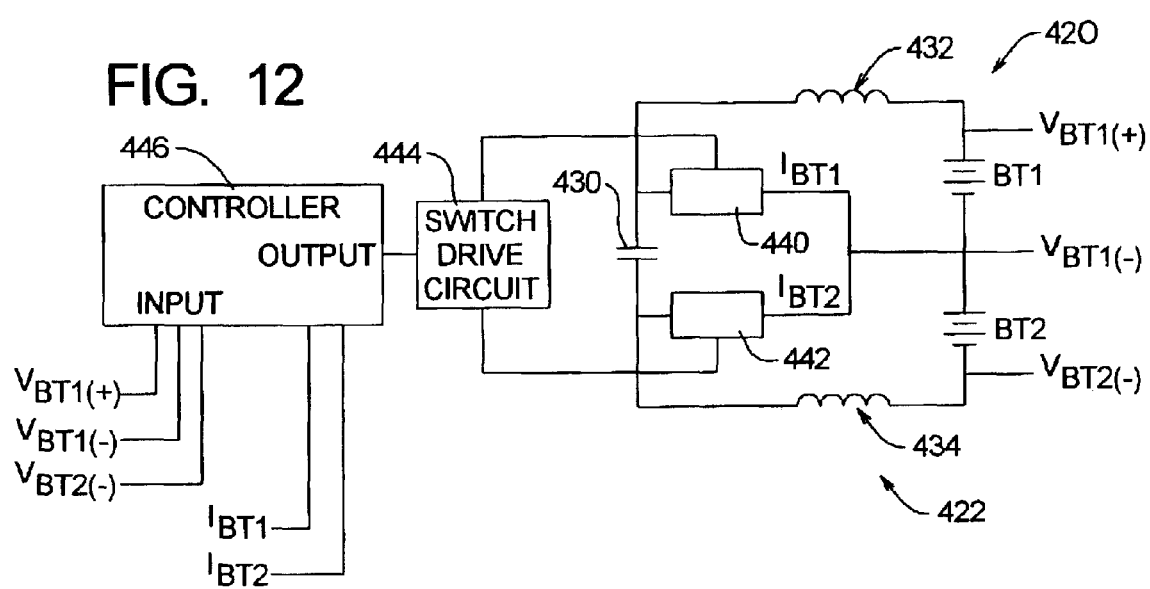
FIG. 12 is a block diagram depicting yet another exemplary circuit implementing the charge balancing system of the present invention.

Referring now to FIG. 12, depicted therein is a battery balancing system 420 constructed in accordance with, and embodying, the principles of yet another embodiment of the present invention. The exemplary system 420 comprises a circuit 422 adapted to balance the charge on first and second batteries 424a and 424b, but the exemplary circuit 422 may be applied to strings of batteries comprising more than two batteries.

FIG. 12 further illustrates that the exemplary charge balancing circuit 422 comprises a capacitor 430 and first and second inductors 432 and 434. The capacitor 430 is connected to the first and second inductors 432 and 434. In the exemplary circuit 422, the first inductor 432 is connected between the capacitor 430 and the first battery 424a, and the second inductor 434 is connected between the capacitor 430 and the second battery 424b.

As shown in FIG. 12, the charge balancing circuit 422 further comprises first and second switch circuits 440 and 442 and a switch drive circuit 444. The first switch circuit 440 is connected in parallel with the series connected first inductor 432 and the first battery 424a. The second switch circuit 442 is similarly connected in parallel with the series connected second inductor 434 and the second battery 424b.

In addition, the charge balancing circuit 422 comprises a controller 446 connected to the switch drive circuit 444. The controller 446 generates a drive control signal based upon which the switch drive circuit 444 generates drive signals for operating the switch circuits 440 and 442.

The controller 446 further is connected to sensors that detect voltage levels $V_{BT1(+)}$, $V_{BT1(-)}$, and $V_{BT2(-)}$ and currents $I_{BT1}$ and $I_{BT2}$. The controller 446 generates signals that control the switch drive circuit 444 based on these voltage levels $V_{BT1(+)}$, $V_{BT(-)}$, and $V_{BT2(-)}$ and current levels $I_{BT1}$ and $I_{BT2}$. In particular, the duty cycle, frequency, and/or other characteristics of the drive control signal may be varied to change the drive signals for operating switch circuits 440 and 442. The controller 446 and switch drive circuit 444 can thus form part of a feedback loop optimized for maintaining the voltages $V_{BT1(+)}$, $V_{BT(-)}$, and $V_{BT2(-)}$ and currents $I_{BT1}$ and $I_{BT2}$ at desired levels.

Figure 13:
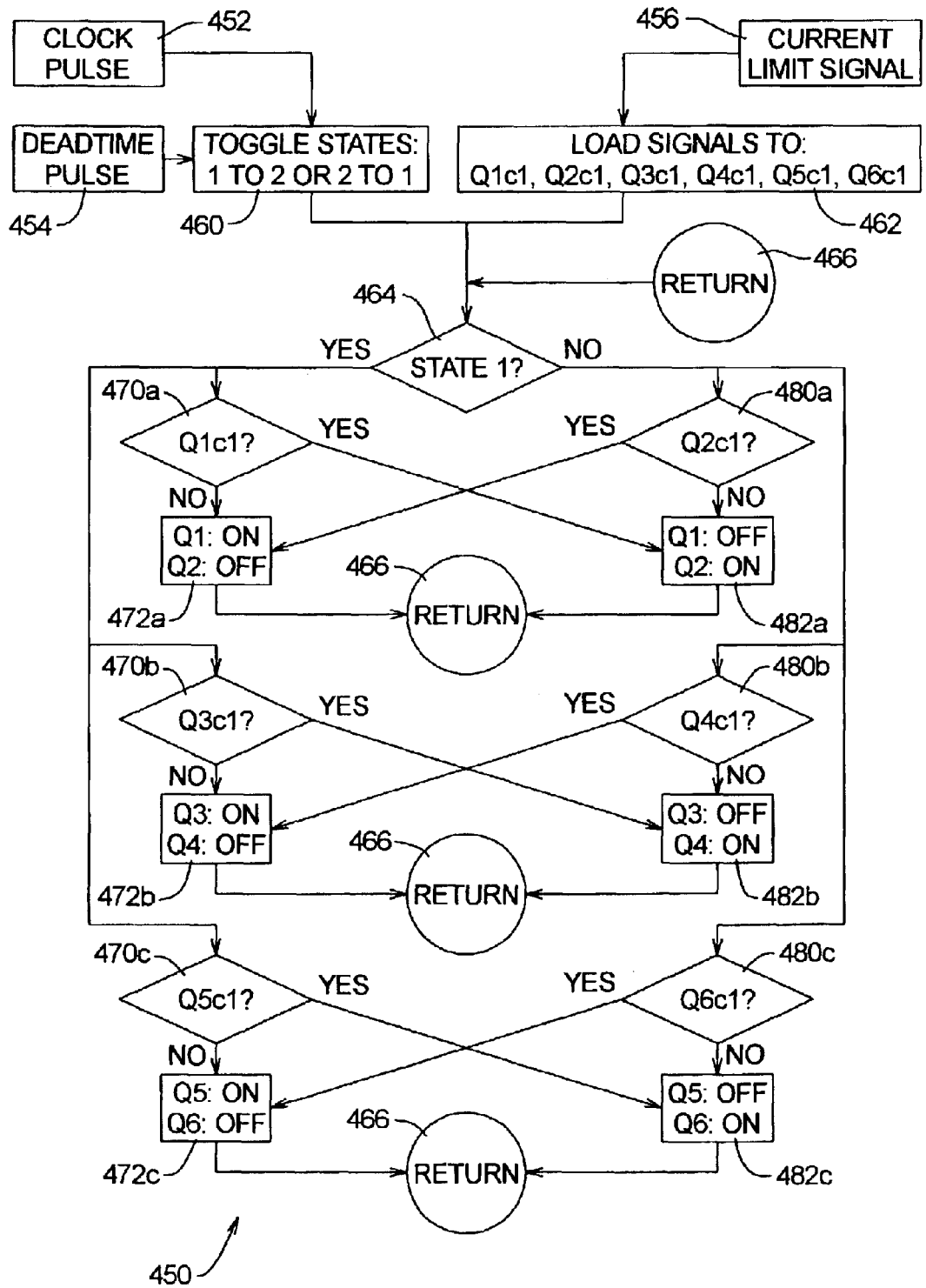
FIG. 13 is a logic flow diagram illustrating an exemplary process for controlling switches of a charge balancing circuit of the present invention to limit current flowing between the batteries.

The drive control signal may be varied for other reasons. Referring now to FIG. 13, depicted at 450 therein is a logic diagram illustrating the steps of a current limiting algorithm that may be used to control the generation of drive signals for controlling switch circuits of a battery balancing circuit for four series connected batteries.

The inputs to the current limiting algorithm 450 are the current levels through the three pairs of switch circuits associated with the four batteries, a dock pulse, and a deadtime pulse. In the nomenclature of the logic diagram in FIG. 13, the signals representative of the currents through the first and second switch circuits of the three switch circuit pairs are identified by the terms Q1c1, Q2c1, Q3c1, Q4c1, Q5c1, and Q6c1, respectively.

Turning now to the current limiting algorithm 450, the clock pulse is input at step 452, the deadtime pulse is input at 454, and a current limit signal is input at step 456. At step 460, the algorithm toggles from "STATE 1" (first switches open; second switches closed) to "STATE 2" (first switches closed; second switches open) based on the clock pulse and the deadtime pulse. The values of the signals Q1c1, Q2c1, Q3c1, Q4c1, Q5c1, and Q6c1 are loaded at step 462.

The algorithm 450 then proceeds to step 464, at which point the system determines whether the switch circuits are in "STATE 1" (YES) or in "STATE 2" (NO). A return location is defined at step 466; the algorithm proceeds to step 464 after returning to the return location.

If the algorithm 450 determines at step 464 that the switch circuits are in "STATE 1", the algorithm proceeds to steps 470a and 472a, 470b and 472b, and 470c and 472c in sequence. If the algorithm 450 determines at step 464 that the switch circuits are in "STATE 2", the algorithm proceeds to steps 480a and 482a, 480b and 482b, and 480c and 482c in sequence.

At each of the steps 470 and 480, the current limit signals are compared with reference values or ranges. For example, if at steps 470a, 470b, and 470c, the signals Q1c1, Q3c1, and Q5c1 favorably compare with the reference values or ranges, the state of the switches is left in "STATE 1" at each of the steps 472a (Q1: ON: Q2: OFF), 472b (Q3: ON; Q4: OFF), and 472c (Q5: ON; Q6: OFF). Similarly, if at steps 480a, 480b, and 480c, the signals Q2c1, Q4c1, and Q6c1 favorably compare with the reference values or ranges, the state of the switches is left in "STATE 2" at each of the steps 482a (Q1: OFF; Q2: ON), 482b (Q3: OFF; Q4: ON), and 482c (Q5: OFF; Q6: ON). After the steps 472 and 482, the algorithm 450 loops back to the return step 466.

Accordingly, as long as the signals Q1c1, Q2c1, Q3c1, Q4c1, Q5c1, and Q6c1 compare favorably with the reference values or ranges, the switches are controlled by the dock pulse 452.

However, if at steps 470a, 470b, and 470c, the signals Q1c1, Q3c1, and Q5c1 do not favorably compare with the reference values or ranges, the state of the switches is changed to "STATE 2" at each of the steps 482a (Q1: OFF; 02: ON), 482b (Q3: OFF; Q4: ON), and 482c (Q5: OFF; Q6: ON). Similarly, if at steps 480a, 480b, and 480c, the signals Q2c1, Q4c1, and Q6c1 do not favorably compare with the reference values or ranges, the state of the switches is changed to "STATE 1" at each of the steps 472a (Q1: ON; Q2: OFF), 472b (Q3: ON; Q4: OFF), and 472c (Q5: ON; Q6: OFF). Again, after the steps 472 and 482, the algorithm 450 loops back to the return step 466.

Therefore, if the signals Q1c1, Q2c1, Q3c1, Q4c1, Q5c1, and Q6c1 do not compare favorably with the reference values or ranges, the switches are turned off independent of the state of the clock pulse 452 to provide current limit protection.

The algorithm thus provides an example in which the switch drive signals are generated based on system parameters rather than on a fixed duty cycle.

From the foregoing, it should be clear that the present invention can be implemented in a number of different embodiments. The scope of the present invention should thus include embodiments of the invention other than those disclosed herein.

We claim:

1. A system for equalizing the voltages across first and second main storage elements coupled in series at a common terminal, the system comprising:
   a capacitive storage element coupled to first and second nodes;
   a first inductive storage element coupled between the first node and the first main storage element;
   a second inductive storage element coupled between the second node and the second main storage element;
   a first switch circuit coupled between the first node and the common terminal;
   a second switch circuit coupled between the second node and the common terminal; and
   a control circuit for operating the first and second switch circuits to control current flow to the first and second main storage elements.

2. A system as recited in claim 1, in which the first and second switch circuits each comprise a switch element and a diode connected in anti-parallel with the switch element.

3. A system as recited in claim 1, in which the control circuit generates first and second control signals for operating the first and second switch circuits, where the second control signal is the inverse of the first signal.

4. A system as recited in claim 1, in which the first and second control signals have a duty cycle of approximately fifty-percent.

5. A system as recited in claim 1, in which the control circuit operates the first and second switch circuits such that the first switch circuit allows current flow when the second switch circuit prevents current flow and the second switch circuit allows current flow when the first switch circuit prevents current flow.

6. A system as recited in claim 1 in which the control circuit operates the first and second switch circuits such that at least one of the first and second switch circuits is open at all times.

7. A system as recited in claim 1, in which the control circuit operates the first and second switches such that current flowing into any of the first and second main storage elements is substantially continuous.

8. A system as recited in claim 1, in which the control circuit comprises:
   a clock circuit for generating a clock signal; and
   an isolation circuit for isolating the clock circuit from switch circuits.

9. A system as recited in claim 3, in which the first and second control signals are generated based on predetermined system parameters.

10. A system as recited in claim 3, in which the first and second control signals are generated based on a clock pulse.

11. A system as recited in claim 9, in which the first and second control signals are further generated based on a clock pulse.

12. A system as recited in claim 9, in which the first and second control signals are generated based on a comparison of the predetermined system parameters with a reference.

13. A system for equalizing the voltages across a plurality of main storage elements coupled in series at at least one common terminal, the system comprising:
   a capacitive storage element associated with each pair of adjacent main storage elements coupled at one of the common terminals, where each capacitive storage element is coupled to first and second nodes;
   first and second inductive storage elements associated with each capacitive storage element, where
      the first inductive storage elements are coupled between the first nodes and a first main storage element of each pair of adjacent main storage elements, and
      the second inductive storage elements are coupled between the second nodes and a second main storage element of each pair of adjacent main storage elements;
   first and second switch circuits associated with each capacitive storage element, where
      the first switch circuits are coupled between the first nodes and the common terminal associated with each pair of adjacent main storage elements, and
      the second switch circuits are coupled between the second nodes and the common terminal associated with each pair of adjacent main storage elements; and
   a control circuit for operating the first and second switch circuits to control current flow to the main storage elements.

14. A system as recited in claim 13, in which the first and second switch circuits each comprise a switch element and a diode connected in anti-parallel with the switch element.

15. A system as recited in claim 13, in which the control circuit generates first and second control signals for operating the first and second switch circuits, respectively, where the second control signal is the inverse of the first signal.

16. A system as recited in claim 13, in which the first and second control signals have a duty cycle of approximately fifty-percent.

17. A system as recited in claim 13, in which the control circuit operates the first and second switch circuits such that the first switch circuits allow current flow when the second switch circuits prevent current flow and the second switch circuits allow current flow when the first switch circuits prevent current flow.

18. A system as recited in claim 13, in which the control circuit operates the first and second switch circuits such that at least one of the first and second switch circuits is open at all times.

19. A system as recited in claim 13 in which the control circuit operates the first and second switches such that current flowing into any of the first and second main storage elements is substantially continuous.

20. A system as recited in claim 13, in which the control circuit comprises:
   a clock circuit for generating a clock signal; and
   a plurality of isolation circuits for isolating the clock circuit from switch circuits.

21. A system as recited in claim 15, in which the first and second control signals are generated based on predetermined system parameters.

22. A system as recited in claim 15, in which the first and second control signals are generated based on a clock pulse.

23. A system as recited in claim 21, in which the first and second control signals are further generated based on a clock pulse.

24. A system as recited in claim 21, in which the first and second control signals are generated based on a comparison of the predetermined system parameters with a reference.

25. A method of equalizing the voltages across a plurality of main storage elements coupled in series comprising the steps of:

identifying at least one pair of adjacent main storage elements comprising first and second main storage elements connected at a common terminal;

providing a capacitive storage element for each pair of adjacent main storage elements;

coupling the capacitive storage element to first and second nodes;

providing first and second inductive storage elements for each capacitive storage element;

coupling the first inductive storage elements between the first nodes and the first main storage elements;

coupling the second inductive storage elements between the second nodes and the second main storage elements;

providing first and second switch circuits for each capacitive storage element;

coupling the first switch circuits between the first nodes and the common terminals;

coupling the second switch circuits between the second nodes and the common terminals; and operating the first and second switch circuits to control current flow to the main storage elements.

26. A method as recited in claim 25, in which the step of operating the first and second switches comprises the steps of opening and closing the first and second switches such that current flowing into any of the first and second main storage elements is substantially continuous.

27. A method as recited in claim 25, further comprising the steps of:

forming a balancing module comprising one capacitive storage unit, one first inductive storage unit, second inductive storage unit, one first switch circuit, and one second switch circuit;

attaching one balancing module to each pair of adjacent main storage elements.

28. A system for charging a plurality of main storage elements coupled in series at at least one common terminal, the system comprising:

a charging system connected across the series connected main storage elements;

a capacitive storage element associated with each pair of adjacent main storage elements coupled at one of the common terminals, where each capacitive storage element is coupled to first and second nodes;

first and second inductive storage elements associated with each capacitive storage element, where
the first inductive storage elements are coupled between the first nodes and a first main storage element of each pair of adjacent main storage elements, and
the second inductive storage elements are coupled between the second nodes and a second main storage element of each pair of adjacent main storage elements;

first and second switch circuits associated with each capacitive storage element, where
the first switch circuits are coupled between the first nodes and the common terminal associated with each pair of adjacent main storage elements, and
the second switch circuits are coupled between the second nodes and the common terminal associated with each pair of adjacent main storage elements; and a control circuit for operating the first and second switch circuits to control current flow to the main storage elements.

* * * * *